(12) United States Patent
Gambino et al.

(10) Patent No.: US 9,798,088 B2
(45) Date of Patent: Oct. 24, 2017

(54) BARRIER STRUCTURES FOR UNDERFILL BLOCKOUT REGIONS

(71) Applicant: GLOBALFOUNDRIES INC., Grand Cayman (KY)

(72) Inventors: Jeffrey P. Gambino, Portland, OR (US); Robert K. Leidy, Burlington, VT (US); Wolfgang Sauter, Eagle-Vail, CO (US); Christopher D. Muzzy, Burlington, VT (US); Eric Turcotte, Quebec (CA); Thomas E. Lombardi, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 3 days.

(21) Appl. No.: 14/933,668

(22) Filed: Nov. 5, 2015

(65) Prior Publication Data

US 2017/0131476 A1  May 11, 2017

(51) Int. Cl.
  *G02B 6/30* (2006.01)
  *G02B 6/13* (2006.01)
(52) U.S. Cl.
  CPC ...... *G02B 6/30* (2013.01); *G02B 6/13* (2013.01)
(58) Field of Classification Search
  CPC .................................. G02B 6/30; G02B 6/13
  See application file for complete search history.

(56) References Cited

U.S. PATENT DOCUMENTS

| 4,934,778 | A | * | 6/1990 | Gillett | G02B 6/3839 385/55 |
| 5,120,678 | A | * | 6/1992 | Moore | H01L 23/49816 174/522 |
| 5,956,576 | A | * | 9/1999 | Toy | H01L 23/10 257/704 |
| 6,101,715 | A | * | 8/2000 | Fuesser | H01C 1/082 165/104.33 |
| 6,392,296 | B1 | * | 5/2002 | Ahn | G02B 6/4201 257/698 |

(Continued)

FOREIGN PATENT DOCUMENTS

| CN | 103855114 A | 6/2014 |
| CN | 101473258 B | 11/2014 |

OTHER PUBLICATIONS

Green et al., "Silicon photonic wire circuits for on-chip optical interconnects," Advanced Fabrication Technologies for Micro/Nano Optics and Photonics, vol. 6883, 2008, pp. 1-10, New York.

(Continued)

*Primary Examiner* — Peter Radkowski
(74) *Attorney, Agent, or Firm* — Michael LeStrange; Andrew M. Calderon; Roberts Mlotkowski Safran Cole & Calderon, P.C.

(57) ABSTRACT

The disclosure relates to semiconductor structures and, more particularly, to barrier structures for underfill blockout regions uses in phonotics chip packaging and methods of manufacture. The structure includes a substrate with a plurality of solder connections and at least one optical fiber interface disposed within at least one cavity of the substrate. The structure further includes a barrier structure formed about the cavity which is structured to prevent underfill material from degrading an optical coupling of the optical fiber.

15 Claims, 4 Drawing Sheets

(56) References Cited

U.S. PATENT DOCUMENTS

| | | | |
|---|---|---|---|
| 6,586,835 B1* | 7/2003 | Ahn | G02B 6/4214 257/668 |
| 6,749,345 B1* | 6/2004 | Gee | G02B 6/421 385/75 |
| 6,821,802 B2* | 11/2004 | Ahn | G02B 6/4201 257/E25.032 |
| 6,904,673 B1* | 6/2005 | Blais | H01L 24/81 156/182 |
| 6,907,151 B2* | 6/2005 | Yunus | G02B 6/4214 385/14 |
| 6,940,182 B2* | 9/2005 | Hilton | H01L 21/563 257/787 |
| 7,022,553 B2* | 4/2006 | Ahn | G02B 6/4214 257/717 |
| 7,242,823 B2* | 7/2007 | Karashima | G02B 6/3636 257/499 |
| 7,326,638 B2* | 2/2008 | Kurata | H01L 21/561 257/E21.508 |
| 7,755,206 B2* | 7/2010 | Farooq | H01L 24/72 257/734 |
| 7,791,209 B2* | 9/2010 | Hisada | H01L 21/563 257/738 |
| 8,031,993 B2* | 10/2011 | Bowen | G02B 6/262 385/38 |
| 8,236,615 B2* | 8/2012 | Blander | H01L 23/295 257/788 |
| 8,350,383 B2* | 1/2013 | Daubenspeck | H01L 21/563 257/730 |
| 8,492,199 B2* | 7/2013 | Coffin | H01L 21/563 438/108 |
| 8,558,360 B2* | 10/2013 | Kim | H01L 21/563 257/669 |
| 8,581,406 B1* | 11/2013 | Robbins | H05K 3/3436 257/288 |
| 8,597,982 B2* | 12/2013 | Foote | H01L 24/83 257/E21.499 |
| 8,624,364 B2* | 1/2014 | Chow | H01L 21/563 257/667 |
| 8,691,626 B2* | 4/2014 | Su | H01L 21/563 257/685 |
| 8,757,897 B2* | 6/2014 | Kosenko | 216/13 |
| 8,786,059 B2* | 7/2014 | Blander | H01L 23/295 257/632 |
| 9,058,971 B2* | 6/2015 | Shih | H01L 25/00 |
| 9,103,971 B2* | 8/2015 | Yasuda | G02B 6/12 |
| 9,151,915 B2* | 10/2015 | Castagna | G02B 6/4214 |
| 9,201,200 B2* | 12/2015 | Bowen | G02B 6/30 |
| 9,275,879 B1* | 3/2016 | Gaynes | H01L 22/20 |
| 9,304,264 B2* | 4/2016 | Bowen | G02B 6/3881 |
| 9,417,415 B2* | 8/2016 | Tummala | G02B 6/43 |
| 2002/0003232 A1* | 1/2002 | Ahn | G02B 6/4201 257/81 |
| 2004/0057648 A1* | 3/2004 | Yunus | G02B 6/4214 385/14 |
| 2004/0084781 A1* | 5/2004 | Ahn | G02B 6/4214 257/777 |
| 2004/0118599 A1* | 6/2004 | Chason | B81C 1/00333 174/260 |
| 2005/0069013 A1* | 3/2005 | Bhandarkar | G02B 6/4204 372/102 |
| 2005/0196095 A1* | 9/2005 | Karashima | G02B 6/3636 385/14 |
| 2006/0128059 A1* | 6/2006 | Ahn | G02B 6/4214 438/108 |
| 2007/0224735 A1* | 9/2007 | Karashima | G02B 6/3636 438/128 |
| 2007/0290378 A1* | 12/2007 | Coffin | H01L 21/563 257/791 |
| 2009/0229513 A1* | 9/2009 | Hisada | H01L 21/563 118/50 |
| 2009/0230566 A1* | 9/2009 | Hisada | H01L 21/563 257/778 |
| 2009/0294162 A1* | 12/2009 | Jeong | H01L 21/563 174/260 |
| 2011/0012249 A1* | 1/2011 | Daubenspeck | H01L 21/563 257/686 |
| 2011/0121469 A1* | 5/2011 | Blander | H01L 23/295 257/788 |
| 2012/0021567 A1* | 1/2012 | Coffin | H01L 21/563 438/126 |
| 2012/0061853 A1* | 3/2012 | Su | H01L 21/563 257/778 |
| 2012/0189245 A1* | 7/2012 | Bowen | G02B 6/4214 385/14 |
| 2012/0228748 A1* | 9/2012 | Blander | H01L 23/295 257/632 |
| 2012/0321250 A1* | 12/2012 | Yamaji | G02B 6/4214 385/38 |
| 2013/0004118 A1* | 1/2013 | Castagna | G02B 6/4214 385/14 |
| 2013/0177281 A1* | 7/2013 | Kosenko | G02B 6/4214 385/89 |
| 2013/0182994 A1* | 7/2013 | Castagna | G02B 6/4214 385/14 |
| 2013/0188907 A1* | 7/2013 | Yasuda | G02B 6/12 385/14 |
| 2014/0029894 A1* | 1/2014 | Bowen | G02B 6/30 385/37 |
| 2014/0092576 A1* | 4/2014 | Lucero | H01L 25/167 361/783 |
| 2014/0167263 A1* | 6/2014 | Wu | H01L 21/565 257/741 |
| 2014/0192832 A1* | 7/2014 | Shih | H01L 25/00 372/44.01 |
| 2014/0321809 A1* | 10/2014 | Bowen | G02B 6/3881 385/65 |
| 2014/0328596 A1* | 11/2014 | Mathai | G02B 6/4245 398/116 |
| 2014/0355931 A1* | 12/2014 | Tummala | G02B 6/43 385/14 |

OTHER PUBLICATIONS

Lindenmann et al., "Photonic wire bonding: a novel concept for chip-scale interconnects," Optics Express, Jul. 20, 2012, pp. 17667-17677, vol. 20, No. 16, Germany.

* cited by examiner

BARRIER STRUCTURES FOR UNDERFILL BLOCKOUT REGIONS

FIELD OF THE INVENTION

The present disclosure relates to semiconductor structures and, more particularly, to barrier structures for underfill blockout regions used in phonotics chip packaging and methods of manufacture.

BACKGROUND

Silicon photonics chips are being developed for high speed interconnects between dies. Waveguides can be built on silicon on insulator (SOI) wafers and can be integrated with CMOS devices. In order to make such integration, though, a connection must be made between an "off-chip" optical fiber and the waveguide structure, itself. Out-of-plane coupling uses an optical grating to couple light from the optical fiber to the waveguide structure, but this limits the optical signal to one wavelength. In-plane coupling, on the other hand, allows broadband transmission (multiple wavelengths, and therefore higher bandwidth). However, achieving high coupling efficiency with in-plane coupling is difficult.

A reason for loss for in-plane coupling is that the core of the optical fiber has a much larger diameter than the Si waveguide structure. The loss can be reduced using an inverse taper on the Si waveguide, for improved coupling. For maximum coupling, it is important to surround the Si waveguide structure with $SiO_2$ or an optical epoxy (same refractive index as $SiO_2$). If the waveguide structure is not surrounded by the appropriate optical material (e.g., $SiO_2$ or optical epoxy), some light will couple into the substrate and the signal will be reduced.

A cavity under the Si waveguide can be filled with optical epoxy to provide the desired optical performance. However, the epoxy is inserted into the cavity after the chip has been joined to an interposer. But, the chip join process includes an underfill material for stability and mechanical strength, which can diffuse into the cavity (instead of optical epoxy) resulting in degraded optical coupling.

SUMMARY

In an aspect of the disclosure, a structure includes a substrate with a plurality of solder connections and at least one optical fiber interface disposed within at least one cavity of the substrate. The structure further includes a barrier structure formed about the cavity which is structured to prevent underfill material from degrading an optical coupling of the optical fiber.

In an aspect of the disclosure, a structure includes: a photonics chip mounted to an interposer with a plurality of solder connections; at least one cavity formed in a substrate of the photonics chip; a waveguide structure extending into the at least one cavity; an optical fiber coupled to the waveguide structure within the at least one cavity; and a barrier structure formed about a region which the optical fiber is coupled to the waveguide structure.

In an aspect of the disclosure, a method includes: forming a cavity in a substrate; forming a barrier structure about the cavity; connecting the substrate to an interposer with solder connections; filling a space between the substrate and the interposer material with underfill material, wherein the underfill material is preventing from passing the barrier structure; coupling at least one optical fiber to a waveguide structure within the cavity; and filling the cavity with material.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to barrier structures for underfill blockout regions used in phonotics chip packaging and methods of manufacture. More specifically, the present disclosure is directed to a dam structure (barrier structure) composed of solder or a polymer spacer to prevent underfill diffusion into an optical cavity of a phonotics chip package. In embodiments, the barrier structure will prevent the underfill material from diffusing (entering) into the optical cavity during the underfill process and hence prevent degradation of the optical coupling between the optical fiber and waveguide structure.

In embodiments, the structure includes a substrate and a ball grid array (e.g., plurality of solder balls) disposed on the substrate. An optical fiber interface is disposed on a first region of the substrate (e.g., within a cavity) devoid of the solder balls. An insulating underfill material is formed in the interstitial areas between the solder balls, with the barrier structure surrounding the optical fiber interface to prevent the underfill from forming in the first region (e.g., optical cavity) of the substrate.

Figure 1:
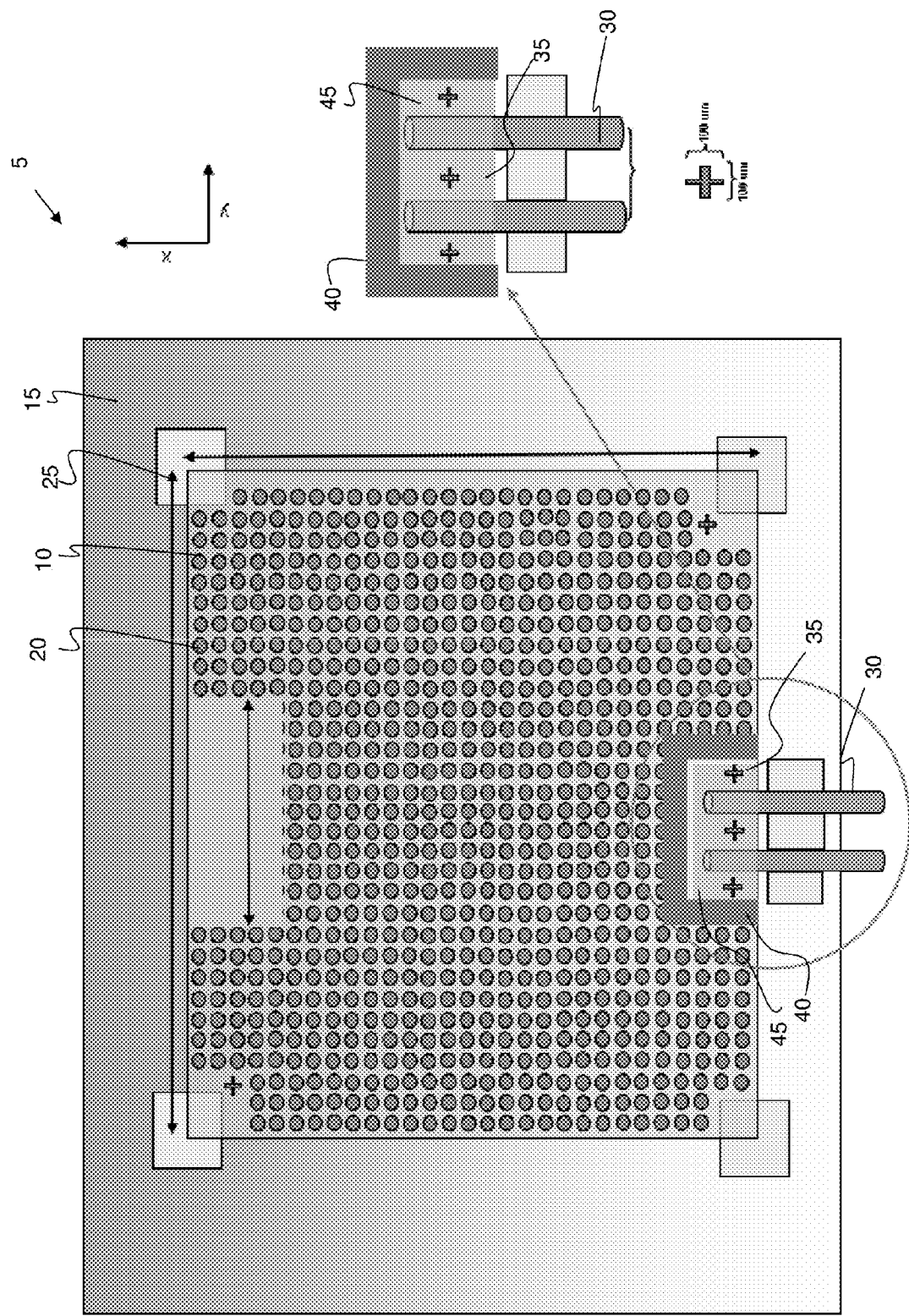
FIG. 1 shows a top view of a photonics chip positioned on an interposer with optical fibers in accordance with aspects of the present disclosure.

FIG. 1 shows a top view of a photonics chip positioned on an interposer with optical fibers in accordance with aspects of the present disclosure. More specifically, the structure 5 includes a substrate 10 (e.g., photonics chip) mounted on an interposer 15. In embodiments, the photonics chip 10 includes a waveguide structure (see, e.g., FIGS. 3 and 4) and a plurality of connections 20. In embodiments, the plurality of connections 20 are composed of a ball grid array and more specifically a plurality of solder balls. In embodiments, the solder balls can be, e.g., controlled collapse chip connections (C4 connections).

As one of skill in the art would understand, C4 connections is a process for interconnecting semiconductor devices, such as integrated circuit chips to external circuitry with solder bumps that have been deposited onto chip pads. The solder bumps are deposited on the chip pads on the top side of the wafer during the final wafer processing step. In order to mount the chip to external circuitry (e.g., a circuit board or another chip or wafer), it is flipped over so that its top side faces down, and aligned so that its pads align with matching pads on the external circuit, and then the solder is reflowed to complete the interconnect. This is in contrast to wire bonding, in which the chip is mounted upright and wires are used to interconnect the chip pads to external circuitry.

Still referring to FIG. 1, the photonics chip 10 can be mounted onto polymer spacers 25, which are positioned between the photonics chip 10 and the interposer 15. The interposer 15 can be, for example, a glass interposer. One or more optical fibers 30 are optically coupled to the photonics chip 10 and more specifically to the waveguide structure. In embodiments, the optical fibers 30 are positioned within a cavity 35 (e.g., optical cavity) formed within the photonics chip 10. In embodiments, the cavity 35 can be a V-shaped groove which is surrounded or enclosed using, at least in part, a barrier structure 40. It is understood by those of skill in the art, though, that the cavity 35 can be other shapes such as a V-shaped groove with a flattened bottom, etc.

As described herein, the barrier structure 40 can be composed of solder material or polymer material, in any of the aspects described herein. The cavity 35 can also be filled with $SiO_2$ or an optical epoxy material 45 (hereinafter referred to as optical epoxy). Advantageously, in embodiments, the barrier structure 40 allows the optical fibers 30 to be inserted into the cavity 35 while still allowing the use of optical epoxy 45 to fill remaining portions of the cavity 35 and underfill material to provide mechanical stability to the die (photonics chip) mounted on the interposer. The underfill material is formed in the interstitial areas between the solder balls 20.

By way of more specific example and still referring to FIG. 1, the cavity 35 can have a pitch of approximately 500 μm and a length of approximately 650 μm. However, it should be understood that the cavity 35 can include other dimensions based on the structural dimensions (e.g., width, height and length) of the waveguide structure and optical fibers 30, as well as other design and engineering criteria. For example, the cavity 35 can be dimensioned to accommodate any type of optical fibers used in photonics chip packaging. Moreover, although it is preferred that the barrier structure 40 surround the entirety of the cavity 35, in aspects provided herein the barrier structure 40 need only be dimensioned and structure to prevent underfill material from diffusing into portions of the cavity which would degrade optical quality, e.g., degrade optical coupling. Accordingly, the barrier structure 40 can be dimensioned smaller or larger than the cavity 35, itself.

As noted herein, the barrier structure 40 can be composed of solder material or polymer material, as examples. In the example of solder material, the barrier structure 40 can be formed by joining solder balls together to create channels of solder material having a height of about 85 microns and a width of about 75 microns to about 90 microns, in one illustrative non-limiting example. The length and other dimensions of each solder channel (e.g., segments of the barrier structure 40) can vary depending on the considerations noted herein, e.g., structural dimensions of the waveguide structure and optical fibers 30, as well as other design and engineering criteria.

In embodiments, the height of the barrier structure 40 can extend completely between the facing surfaces of the photonics chip 10 and the interposer 15. In alternative aspects, the height of the barrier structure 40 can extend partially between the facing surfaces of the photonics chip 10 and the interposer 15, leaving a space between the barrier structure 40 and the interposer 15. The dimensions of the space can be based on the viscosity of the underfill material. For example, the dimensions of the space will have such a height as to prevent underfill material from entering the cavity 35 and/or degrading the optical quality, e.g., degrade the optical coupling between the optical fibers 30 and the waveguide structure.

In embodiments, the barrier structure 40 of solder material can be manufactured simultaneously with the plurality of solder ball connections 20 using a number of different tools. In general, though, the methodologies and tools are used to form structures with dimensions in the micrometer and nanometer scale. The methodologies, i.e., technologies, employed to manufacture the barrier structure 40 of solder material of the present disclosure have been adopted from integrated circuit (IC) technology. For example, the structures are built on wafers and are realized in films of material patterned by photolithographic processes on the top of a wafer. In particular, the fabrication of the barrier structure 40 of solder material uses three basic building blocks: (i) deposition of thin films of material on a substrate, (ii) applying a patterned mask on top of the films by photolithographic imaging, and (iii) etching the films selectively to the mask.

More specifically, the barrier structure 40 of solder material can be composed of a barrier material comprising TiN or TiW followed by a seed layer of copper or other low resistance conductive layer used during back end of the line (BEOL) processes. The barrier material can be deposited by a conventional chemical vapor deposition (CVD) process to a thickness of about 100 nm, followed by the seed layer to a thickness of about 400 nm; although other dimensions are also contemplated by the present invention.

The barrier material and seed layer can be patterned using conventional lithography and etching processes. For example, a resist layer can be formed over the seed layer, followed by exposure to energy (light) to form openings therein. The solder material can then be formed using conventional electroplating processes, e.g., tin and silver baths. In embodiments, the solder material can have a height of about 85 microns, in one non-limiting example. The resist can then be removed using, e.g., oxygen ashing or other conventional stripping process. An etching process, e.g., reactive ion etching (RIE), is then performed to pattern the barrier material and seed layer by removing material in unwanted areas. Advantageously, in this process the barrier structure 40 can be fabricated simultaneously with the plurality of solder ball connections 20.

Figure 2:
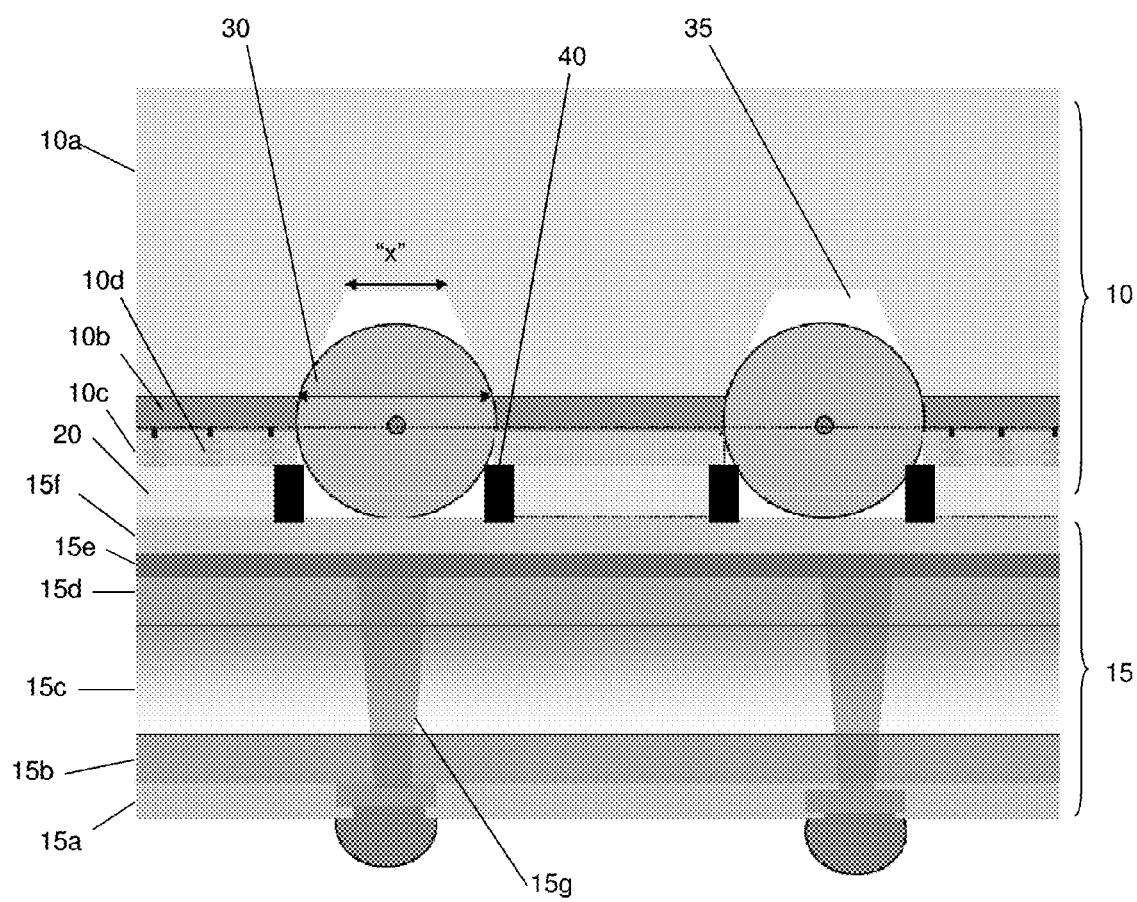
FIG. 2 shows a cross sectional view of the photonics chip positioned on an interposer with optical fibers in accordance with aspects of the present disclosure.

FIG. 2 shows a cross sectional view of the photonics chip package in accordance with aspects of the present disclosure. As shown in FIG. 2, the photonics chip 10 is mounted on the interposer 15, with the optical fibers 30 each of which positioned within a separate cavity 35 (e.g., optical cavity) formed within the photonics chip 10. In embodiments, the cavity 35 is a V-shaped groove which is surrounded by the barrier structure 40. In this example, the V-shaped groove can be modified to have a flat surface with a dimension "x" of about 60 μm and a width of approximately 125 μm (or other dimensions matched to a diameter of the optical fibers 30). For illustrative purposes, the cavity 35 is not filled with the epoxy material.

In embodiments, the photonics chip 10 can include several layers including a semiconductor substrate 10a, an insulator layer 10b (buried oxide layer (BOX) and back end of the line (BEOL) metal fill layers 10c with guardring structures 10d formed therein. The photonics chip 10 further includes the plurality of solder connections represented at reference numeral 20. The interposer 15 can include several layers including, e.g., a passivation layer 15a, a polymer layer 15b, a glass interposer layer 15c, a polymer layer 15d, a copper layer 15e and a passivation layer 15f. The interposer 15 can further include a conductive (metal) via connection 15g as should be understood by those of skill in the art. It should be understood by those of skill in the art that the photonics chip 10 and interposer 15 can include other layers depending on the design and engineering considerations for the particular application.

Figure 3:
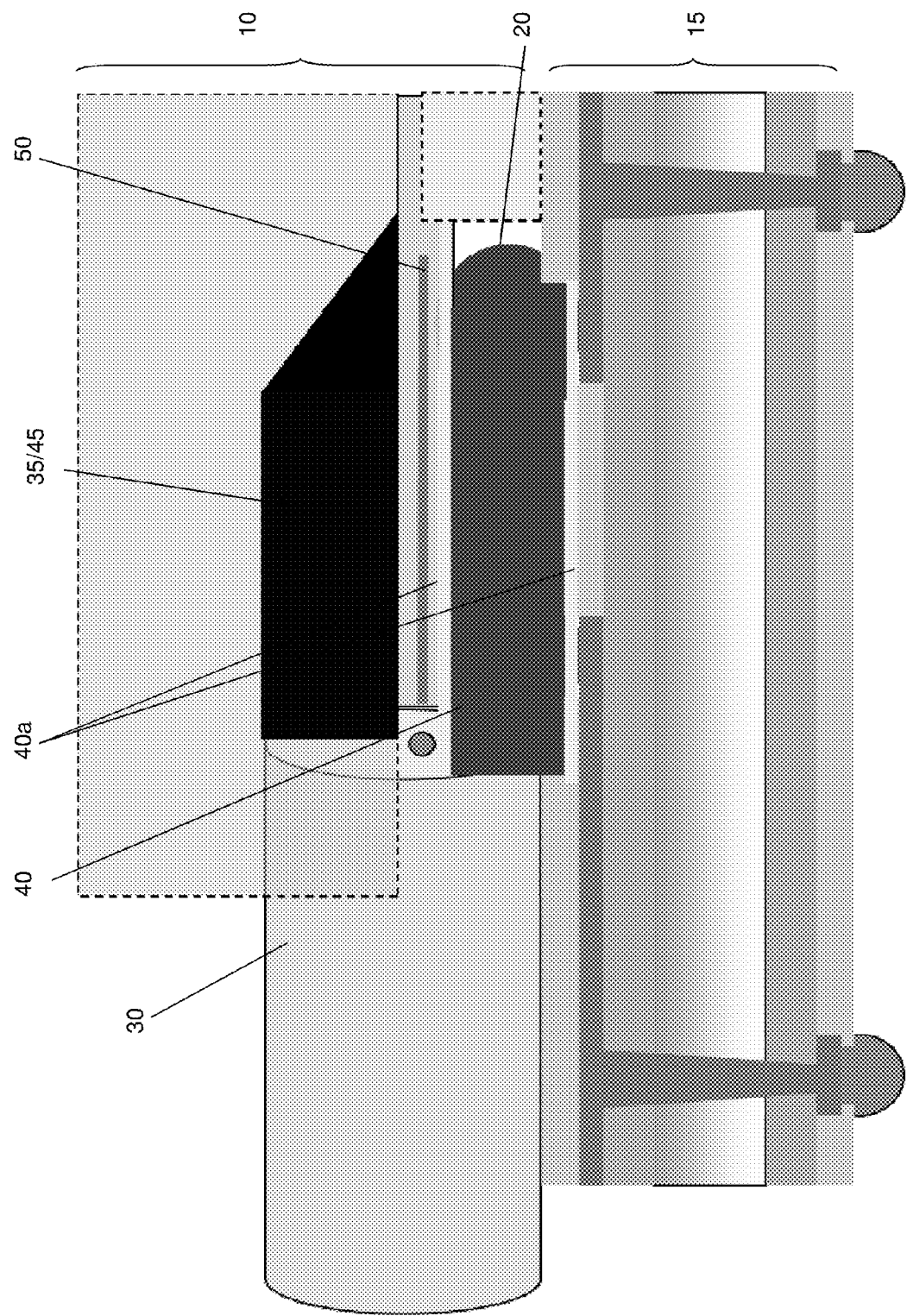
FIG. 3 shows another cross sectional view of the photonics chip positioned on an interposer with optical fibers in accordance with aspects of the present disclosure.

FIG. 3 shows a cross sectional view of the photonics chip positioned on an interposer with optical fibers in accordance with aspects of the present disclosure. As shown in FIG. 3, the photonics chip 10 is mounted on the interposer 15, with the optical fibers 30 positioned within the cavity 35 (e.g., optical cavity). In embodiments, the cavity 35 is a V-shaped groove which is surrounded by the barrier structure 40. In this example view, the cavity 35 is shown to accommodate the optical fibers 30 and portions of the waveguide structure 50. The cavity 35 is filled with epoxy material 45. As further shown in this view, the barrier structure 40 is formed partly from a solder connection structure 20 and extends fully between facing surfaces of the photonics chip 10 and the interposer 15, and surrounding the cavity 35. That is, the barrier structure 40 contacts the facing surface of both the photonics chip 10 and the interposer 15. The barrier structure 40, much like the solder connections 20, is formed on barrier materials 40a using the processes described herein. In this embodiment, the barrier structure can also be formed with a polymer material using conventional CMOS processes.

Figure 4:
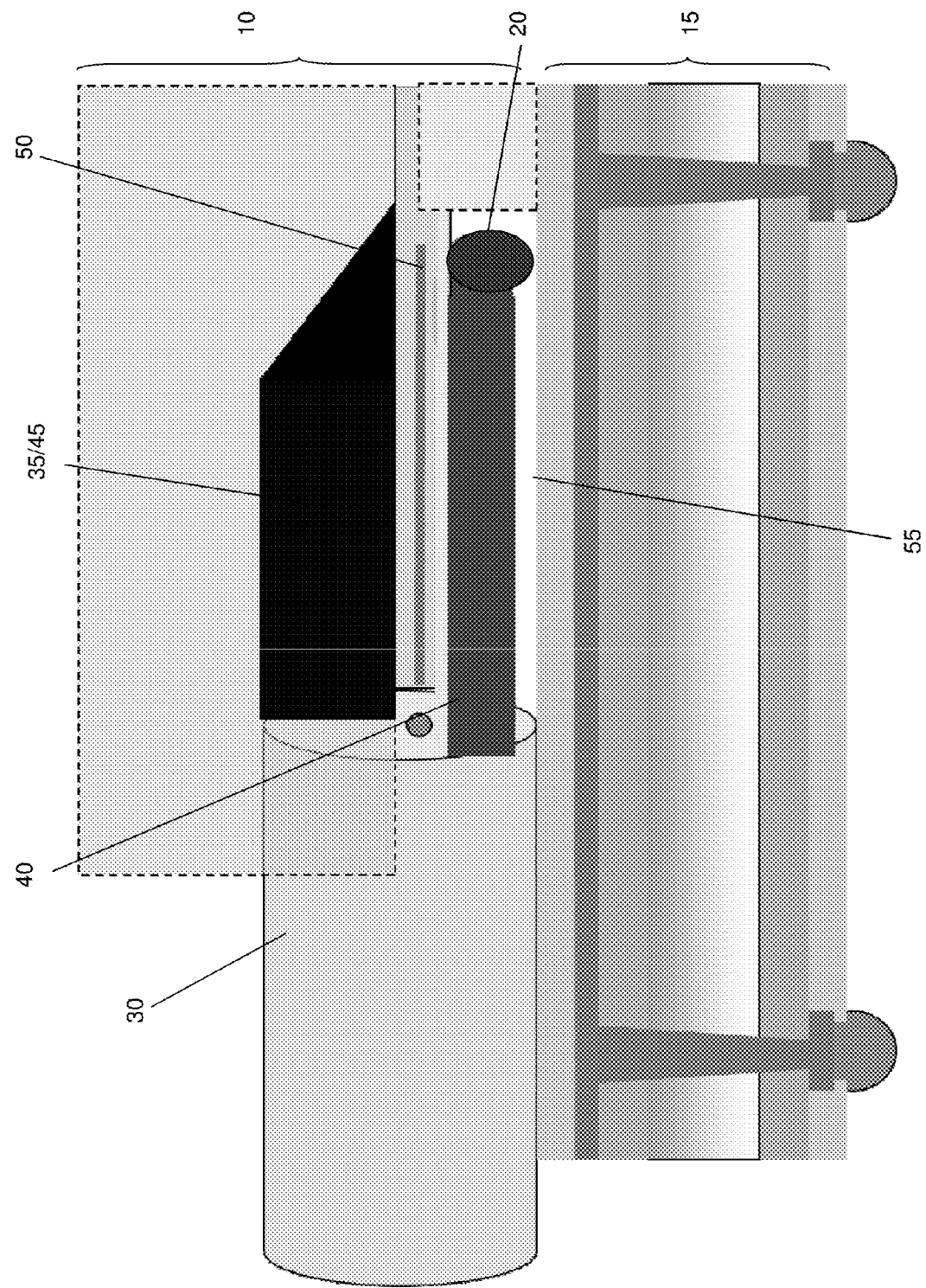
FIG. 4 shows a cross sectional view of the photonics chip positioned on an interposer with optical fibers in accordance with additional aspects of the present disclosure.

FIG. 4 shows a cross sectional view of the photonics chip positioned on an interposer with optical fibers in accordance with aspects of the present disclosure. As shown in FIG. 4, the photonics chip 10 is mounted on the interposer 15, with the optical fibers 30 positioned within the cavity 35 (e.g., optical cavity). In embodiments, the cavity 35 is filled with epoxy material 45. As further shown in this view, the barrier structure 40 is formed partly from a solder connection structure 20 and extends partly between facing surfaces of the photonics chip 10 and the interposer 15, leaving a space 55. The space 55 is of such dimensions as to prevent underfill material from entering the cavity 35 and degrading the optical quality, e.g., degrade the optical coupling between the optical fibers 30 and the waveguide structure 50. In this embodiment, the barrier structure can also be formed with a polymer material using conventional CMOS processes.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
   a substrate with a plurality of solder connections;
   at least one optical fiber disposed within at least one cavity of the substrate; and
   a barrier structure formed about and surrounding an entirety of the cavity and which is structured to prevent underfill material from degrading an optical coupling of the optical fiber,
   wherein the barrier structure extends partially between facing surfaces of the substrate and an interposer joined to the substrate, leaving a space between the barrier structure and the interposer, and the cavity is filled with an optical epoxy.

2. The structure of claim 1, wherein the substrate is a photonics chip comprising a waveguide structure extending into the at least one cavity and optically coupled to the at least one optical fiber, and the solder connections couple the photonics chip to an interposer.

3. The structure of claim 2, wherein the barrier structure is structured to prevent the underfill material from entering the at least one cavity wherein the at least one optical fiber is optically coupled to the waveguide structure.

4. The structure of claim 3, wherein the barrier structure is composed of connected solder connections.

5. The structure of claim 3, wherein the barrier structure is composed of polymer material.

6. The structure of claim 1, wherein the at least one cavity is devoid of solder balls.

7. The structure of claim 1, wherein:
   the at least one cavity is two cavities and the at least one optical fiber is two optical fibers;
   each of the two optical fibers extend within separate ones of the two cavities; and
   the barrier structure is two barrier structures, each of which surround a separate cavity of the two cavities.

8. A structure, comprising:
   a photonics chip mounted to an interposer with a plurality of solder connections;
   at least one cavity formed in a substrate of the photonics chip;
   a waveguide structure extending into the at least one cavity;
   an optical fiber coupled to the waveguide structure within the at least one cavity; and
   a barrier structure formed about a region which the optical fiber is coupled to the waveguide structure so that the barrier structure is positioned within an area of the photonics chip and an area of the interposer,
   wherein the barrier structure extends partially between facing surfaces of the photonics chip and the interposer, leaving a space between the barrier structure and the interposer, and the at least one cavity is filled with an optical epoxy.

9. The structure of claim 8, wherein the barrier structure is formed from connected solder connections.

10. The structure of claim 8, wherein the barrier structure is formed from polymer material.

11. The structure of claim 8, wherein the space is dimensioned to prevent underfill from entering the region which the optical fiber is coupled to the waveguide structure.

12. The structure of claim 8, wherein the space is dimensioned to prevent underfill from entering the cavity where the optical fiber is coupled to the waveguide structure.

13. The structure of claim 1, wherein the cavity is a V-shaped groove with a flattened surface.

14. The structure of claim 13, wherein the barrier structure is made of solder material which includes a barrier material of TiN followed by a seed layer of a low resistance conductive layer used during back end of the line (BEOL) processes.

15. The structure of claim 14, wherein the barrier structure is further structured to allow the at least one optical fiber to be inserted into the cavity while still allowing the optical epoxy to fill remaining portions of the cavity and the underfill material to provide mechanical stability.

\* \* \* \* \*